July 20, 1954     J. L. KRIEGER     2,684,286
PREPARATION OF PHOSPHOROUS ACID
Filed Nov. 26, 1951
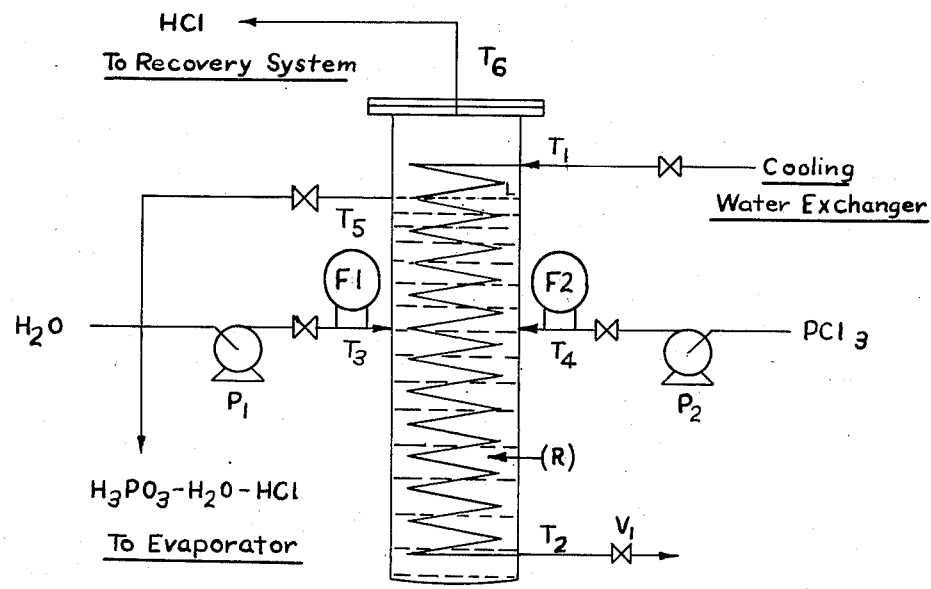
Inventor
Joseph L. Krieger Patented July 20, 1954

2,684,286

UNITED STATES PATENT OFFICE 2,684,286

PREPARATION OF PHOSPHOROUS ACID

Joseph L. Krieger, Baltimore, Md.

Application November 26, 1951, Serial No. 258,256

6 Claims. (Cl. 23—165)

This invention relates to a continuous process for the production of phosphorous acid.

Phosphorous acid has been prepared in the past by a number of methods such as: by the method of B. G. Le Sage, involving the slow combustion of phosphorus by exposure to moist air (Mem. Acad. 321, 1777); by the method of A. Oppenheim, involving the treatment of ordinary phosphorus with concentrated sulphuric acid in sealed dishes at 200° C. (Bull. Soc. Chem. 1-163, 1864); by the method of R. Rother and A. L. Pomdorf, involving the treatment of hypophosphorous acid with $SO_2$ (Jena Zeitschrift 3, 45, 1876); by the method of H. Schiff, R. Bird, S. Diggs and O. J. Walker, involving treatment of yellow phosphorus protected from air with a saturated solution of cupric sulphate (JACS 36, 1382, 1914); by the method of A. Droquet, involving passing a stream of chlorine through water beneath which phosphorus is melted (Jour. Chem. Med. 4, 220, 1828); by the method of R. Engel, involving treatment of hypophosphorous acid with metal oxides or salt solutions (Compt. Rend. 110, 786, 1890); by the action of water upon phosphorous oxide; by the method of Davy, involving treatment of liquid phosphorous trichloride with water (Phil. Trans. 102, 405, 1812) and by the method of H. Grosheintz, who passed vapors of phosphorous trichloride at 60° C. rapidly in a current of dry air through bottles containing water.

Even though laboratory methods for the preparation of phosphorous acid by a number of procedures have been known for many years, no commercial practical method for its preparation has hitherto been described and, in fact, there is no commercial production of this acid. Methods used heretofore involving phosphorus as the starting material usually give mixtures of phosphorous and phosphoric acid (A. Droquet, Jour. Chem. Med. 4, 220, 1828) and, those involving hypophosphorous acid as the feed, are too expensive because hypophosphorous acid is more expensive than phosphorous acid.

The method of Davy and the improvement by Grosheintz involving the treatment of phosphorous trichloride with water is the generally accepted laboratory method for the preparation of phosphorous acid. It is known, however, that in this method for the preparation of phosphorous acid, the heat of reaction is so great that considerable care is necessary to properly dissipate the heat of reaction since, otherwise, the phosphorous acid formed decomposes to phosphine and orthophosphoric acid according to the reaction

The phosphine in turn decomposes to phosphorus and hydrogen according to Davy accompanied by vivid light and the formation of thick, white vortex rings of phosphoric acid.

Laboratory preparations of phosphorous acid by the reaction of phosphorous trichloride with water are frequently carried out by immersing the reaction flask in a cooling medium or by having a suitable cooling coil in the reactor. If the temperature is too cold, the reaction slows down to the extent that a pool of liquid phosphorous trichloride forms as a bottom layer below the water phase and, as the temperature is slowly raised, reaction accelerates and it becomes extremely hard to control the reaction with the result that the aforementioned difficulties occur and, at times, explosion of the entire reaction mass results. These difficulties are enhanced by the fact that provisions must be made to remove the large volume of hydrochloric acid vapors formed during the reaction without excessive loss of unreacted phosphorous trichloride; e. g., by means of adequate reflux capacity. Experience has shown that, when sufficient reflux capacity is not provided, the heat of reaction is not satisfactorily dissipated even when the reaction mixture is stirred effectively. As a result local hot spots occur in the vapor phase above the reaction mixture to the extent that explosions of varying intensity take place in the vapor phase with the attendant hazard involved therein.

In batch preparation of phosphorous acid by the reaction of phosphorous trichloride, it was observed by the inventor that the violence of the reaction and problems associated therewith tend to decrease as the reaction draws to completion. This led to the discovery of the invention of the process developed and described below. Essentially the novelty of the invention lies in the use of some previously batch prepared liquid reaction product in the reactor to which is fed continuously liquid volumes of phosphorous chloride and a 20%–40% excess of stoichiometrically calculated amount of water, thru independent feed lines. The purpose of the excess water is to dissolve the phosphorous acid formed and to reduce the viscosity of the reaction mixture.

Under these conditions, the heat of reaction is readily controlled by the pre-added reaction product and the reactions proceed smoothly without any of the hitherto mentioned hazards. A means of continuous draw off of the reaction products is provided so that some of the reaction product always remains in the reactor and no further extraneous addition of reaction product is required except upon start-up of new reactors.

The reaction product drawn off continuously consists of phosphorous acid, water and dissolved hydrochloric acid. To recover the dry crystals of phosphorous acid from such a mixture, it has been the previous practice (J. Thomsen, Ber. 3, 187, 1870; 4, 308, 1871; 4, 586, 1871; 7, 996, 1874) to evaporate the liquid by raising the temperature slowly to 180° C. The resulting syrupy liquid crystallizes upon cooling particularly if seeded with previously prepared crystals of phosphorous acid.

In this evaporation step during which residual water and hydrochloric acid are removed there is the hazard of overheating the phosphorous acid and the formation of phosphine. To eliminate this hazard, the present process involves the removal of the water and hydrochloric acid in the presence of a carrier such as benzene or other suitable hydrocarbons or in the presence of an azeotrope former with the water such as alcohol. Thereby, the phosphorous acid can be effectively dehydrated and freed of hydrochloric acid at temperatures well below the decomposition temperature of the phosphorous acid.

The accompanying drawing is a schematic illustration of an apparatus for carrying out the process.

Liquid water is fed from a container on a weighing scale (not shown) by means of pump $P_1$ and liquid phosphorous trichloride is fed from a container on a weighing scale (not shown) by means of pump $P_2$ through flow meters $F_1$ and $F_2$ respectively at rates of 20 lbs./hr. and 40 lbs./hr. respectively into the reactor R. In this manner, there is provided a 20%–40% excess of water over the stoichiometric amount for the reaction.

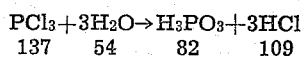

$$PCl_3 + 3H_2O \rightarrow H_3PO_3 + 3HCl$$
$$137 \quad 54 \quad\quad 82 \quad\quad 109$$

The reactor is an airtight cylinder of approximately 40 gallons capacity and is made of material resistant to hydrochloric acid, preferably of Carbate or Hastelloy, although enamel ware of suitable impact strength may also be used as well as other corrosion resistant equipment and equipment made corrosion resistant by application of suitable paints or coatings.

The reactor is provided with an internal cooling coil preferably of the pan cake type to provide maximum cooling capacity and high heat transfer and at the same time is made of material that is resistant to hydrochloric acid such as Carbate, Hastelloy, or the like. Inlet tube $T_1$ leading to a reservoir holding water at 25° C. (not shown) and outlet tube $T_2$ are provided for the internal cooling coil. The outlet tube $T_2$ is provided with a valve $V_1$ which is thermostatically controlled to maintain the water below 50° C., the valve being opened wider automatically to permit increased flow of cold water into inlet tube $T_1$ as the temperature in the reactor tends to rise and throttles down automatically as the temperature in the reactors tends to drop.

The reactor is provided with inlet tubes $T_3$ and $T_4$ for the water and phosphorous trichloride respectively and these tubes are also made of corrosion resistant materials.

The reactor is further provided with an outlet tube $T_5$ which serves as an overflow to permit reaction product to flow out of the reactor continuously and to maintain a constant level of reaction product in the reactor. $T_5$ is also made of hydrochloric acid resistant material and the product from $T_5$ is collected in a suitably corrosion resistant storage drum D (not shown) from which the product is subsequently and continuously evaporated as described below.

Tube $T_6$ serves as the outlet for the large volume of hydrochloric acid gas formed during the reaction. It is made of hydrochloric acid resistant material and leads to a hydrochloric acid recovery system which is not a part of this invention and is not shown in detail.

The reactor R is initially filled to approximately $\frac{1}{10}$ of its volume with the reaction product which is a mixture of phosphorous acid and concentrated hydrochloric acid which may be prepared previously by a batch operation on a laboratory scale or by mixing phosphorous acid with concentrated hydrochloric acid. The reactants enter below the level of the reaction product which is cooled to 50° C.–60° C. and as the reaction proceeds, the temperature is held within the range of 50° C.–60° C. by control of cooling water and by adjusting the feed rate of reactants as required to maintain this temperature. The hydrochloric acid formed by the reaction is continuously evolved as a gas and serves to stir the reaction mixture effectually. The reaction proceeds smoothly and when the product volume reaches or exceeds the level L, it overflows into tube $T_5$ automatically and the process is thus run continuously.

The feed rates for the reactants as given are approximately those to be used for the size of the reactor described. Obviously, the size of the equipment and all of its parts can be increased in size to permit increased production to any capacity desired.

To overcome the previously described difficulties in batchwise evaporation of the reaction product which is a mixture of phosphorous acid, water, and hydrochloric acid, the product from the reaction drums is run batchwise into 2 or more corrosion resistant distillation units $D_1$, $D_2$, $D_3$ (not shown) into which units are also fed a suitable entrainer such as benzene, toluene, a hydrocarbon paraffin fraction, such as a hexane fraction, or an azeotrope former with water, such as alcohol or the like. The reaction mixture, which contains hydrochloric acid in excess of that corresponding to the constant boiling mixture $H_2O$—HCl, is slowly heated by suitable means to drive off excess HCl and then to drive off the constant boiling mixture of HCl and water (110° C.) and then to drive off any residual water by means of the entrainer under conditions whereby the product, liquid phosphorous acid, has no tendency to decompose. When no further water is carried over by the entrainer, the distillation unit is finally heated up to about 120° C. to remove the residual amount of entrainer and then the contents are poured into suitable containers to permit the phosphorous acid to crystallize either with or without seeding. The crystallization containers are preferably tightly covered so as to prevent deliquescence of the phosphorous acid crystals.

The following gives typical data in the operation of the process described in this invention:

Water and phosphorous trichloride were fed as liquids into a corrosion resistant 40 gallon capacity reactor at a rate of 20 and 40 pounds, respectively, per hour, the reactor having had previously led therein 5 gallons of laboratory prepared phosphorous acid reaction product. Cooling water was led into the reactor at approximately 23° C. and it came out at approximately 47° C. The reactor temperature was maintained at about 54° C.

The reaction product was drawn off continuously when it reached the level L in the reactor, at the rate of approximately 59 pounds per hour and evaporated in the presence of added benzene as the water carrier to remove 46.4 pounds per hour, representing 97% of theoretical.

The hydrochloric acid evolved was sent to a standard recovery system and anhydrous hydrochloric acid was recovered at the rate of 60 pounds per hour which represents a 94% of theoretical yield.

I claim:

1. Continuous liquid single phase process for the preparation of phosphorous acid by the reaction of liquid phosphorus trichloride with liquid water in which the liquid reactants are continuously fed concurrently in a ratio of water to phosphorus trichloride such that the water is 20%–40% in excess of the stoichiometric quantity corresponding to the reaction $$PCl_3 + 3H_2O \rightarrow H_3PO_3 + 3HCl$$

and in which the reactants are directly fed below the level of a volume of reaction products maintained in one homogeneous liquid phase, and substantially below 76° C., such reaction products having been obtained by the reaction of phosphorus trichloride and 20%–40% stoichiometric excess of water corresponding to the reaction $PCl_3 + 3H_2O \rightarrow H_3PO_3 + 3HCl$, which liquid phase is added to the reactor before the reactants are delivered to the reactor.

2. Process according to claim 1 in which the reaction is carried out at atmospheric pressure and the temperature of the reaction is maintained in the temperature range between 40° C. and 60° C.

3. Process according to claim 2 in which the reactants are added continuously to a reactor containing a synthetic mixture initially containing phosphorous acid, water and hydrochloric acid until the reaction product contains 20%–40% stoichiometric excess of water.

4. Process according to claim 2 in which the volume of reaction products added to the reactor before the reactants are delivered to the reactor, is not less than 20% by volume of the final total reaction products.

5. Continuous liquid single phase process for the preparation of phosphorous acid by the reaction of liquid phosphorus trichloride with liquid water at atmospheric pressure and at a temperature maintained in the temperature range between 40° C. and 60° C., in which the reactants are fed concurrently, in a molar ratio of water to phosphorus trichloride of 3.6 to 4.2 moles of water to one mole of phosphorus trichloride, to a reactor already containing a volume of reaction products obtained by the reaction of water with phosphorus trichloride in the ratio of 3.6 to 4.2 moles of water to one mole of phosphorus trichloride, and provided with an automatic draw off at the upper surface level of the liquid contents of the reactor so as to maintain a constant level of reaction products, and from which reactor the gaseous hydrochloric acid evolved is fed to a recovery system and recovered.

6. Process according to claim 5, whereby only one homogeneous liquid phase is maintained in the reactor and stratification of a liquid phosphorus trichloride phase from an aqueous phase is avoided in the reactor.

References Cited in the file of this patent

UNITED STATES PATENTS

| Number | Name | Date |
|---|---|---|
| 1,826,302 | Clarke | Oct. 6, 1931 |
| 1,908,239 | Hartman | May 9, 1933 |
| 2,247,373 | Hartford | July 1, 1941 |
| 2,264,759 | Jones | Dec. 2, 1941 |
| 2,528,767 | Marisic | Nov. 7, 1950 |
| 2,595,198 | Lefforge | Apr. 29, 1952 |

FOREIGN PATENTS

| Number | Country | Date |
|---|---|---|
| 8,317 | Great Britain | of 1911 |

OTHER REFERENCES

Handbook of Physics and Chemistry, Chemical Rubber Publishing Co., Cleveland, 1943, pages 426, 427.

Horsely, "Table of Azeotropes and Non-Azeotropes," Industrial and Engineering Chemistry, August 1947, pages 508, 509, 510 and 511.

"Distillation," Interscience Publishers, New York, 1951; Rose, Glasbrook Williams, Carlson, page 368.

J. W. Mellor, "Inorganic and Theoretical Chemistry," vol 8, 1928, pages 1002, 1003; Longmans, Green and Co., New York, publishers.